United States Patent [19]

Geng

[11] Patent Number: 5,675,407
[45] Date of Patent: Oct. 7, 1997

[54] COLOR RANGING METHOD FOR HIGH SPEED LOW-COST THREE DIMENSIONAL SURFACE PROFILE MEASUREMENT

[75] Inventor: Zheng Jason Geng, 4950 Cloister Dr., Rockville, Md. 20852

[73] Assignee: Zheng Jason Geng, Rockville, Md.

[21] Appl. No.: 397,766

[22] Filed: Mar. 2, 1995

[51] Int. Cl.[6] .................................................. G01C 1/00
[52] U.S. Cl. ..................... 356/147; 356/138; 356/121; 356/375; 356/123
[58] Field of Search ................................. 356/375, 376, 356/121, 122, 123, 138, 147

[56] References Cited

U.S. PATENT DOCUMENTS

| 4,668,984 | 5/1987 | Rosenfeld | 356/376 |
| 4,741,621 | 5/1988 | Taff et al. | 356/376 |
| 4,801,207 | 1/1989 | Williams | 356/376 |

*Primary Examiner*—Frank Gonzalez
*Assistant Examiner*—Reginald A. Ratliff

[57] ABSTRACT

The target of the present invention is to provide an automatic high speed, low-cost, multi-mode three-dimensional(3D) surface profile measurement method. This method exploits the projected energy with a known spatially distributed wavelength spectrum on the surface of objects in the scene. The unique wavelength is encoded with geometry information of a unique projection ray of the radiation energy in 3D space. This wavelength of the projected energy is detected by a 2D image sensor array that is able to uniquely distinguish the wavelength of the radiation energy at the points of interest on the scene. The projection geometry information is recovered by using a color match scheme and the range values associated with every pixel of the 2D image sensor will be calculated through a straightforward triangulation algorithm. Full frames of 3D range images can then be obtained directly at the frame acquisition rate of the 2D image sensor array. The color ranging method eliminates the time consuming corresponding feature finding problem of normal binocular 3D imaging systems. Therefore, it is suitable for high speed, real-time measurement automation. Since there are no mechanical moving parts in our color ranging method, the mechanical design can be very simple and reliable. All components in this system are available off-the-shelf which leads to low cost. With the active light source being turned on or off, the same color camera can provide normal intensity images as well as 3D range data. This multi-mode capability greatly simplifies the problems of multiple sensor integration and sensor data fusion. Depending on the applications, the scope of the color spectrum of the energy projector can be selected from UV, visible, or IR light region. The Color Ranging method is not based on a laser therefore there is no "eyes safe" problem. This is certainly a desirable feature enable this system to be used for other commercial applications, such as medical applications like the facial plastic reconstruction surgery evaluation.

8 Claims, 10 Drawing Sheets

COLOR RANGING METHOD FOR HIGH SPEED LOW-COST THREE DIMENSIONAL SURFACE PROFILE MEASUREMENT

FIELD OF INVENTION

This invention relates to methods and apparatus for three-dimensional(3D) surface profile measurement based on spatially varying wavelength spectral light illumination and principles of triangulation. We call this method the "color ranging method".

PRIOR ART

Stereo Vision

A conventional method of measuring a three dimensional (3D) surface profile of objects is stereo vision. A stereo vision system uses two cameras to observe a scene just as with human vision. By processing the two images the 3D surface profile of objects in the scene can be computed. The stereo method works by finding a common feature which is visible in two images. Therefore, the three dimensional surface profile information can not be obtained using data from just a single pixel, instead, such information must be extracted from a group of pixels, such as features like edges and corners. In addition, stereo is very compute intensive and with today's state of the art, cannot be computed at frame rates.

Range From Focus

It is possible to generate range data from focus information. Using a high speed image processing computer the sharpness of an image can be measured in real time, at any point in the image where there is a distinguishable feature. There is a direct relationship between focus and range, so that if focus can be determined in real-time, range can likewise be determined in real-time. In order to determine the range to a multiplicity of points the sharpness of focus must be determined for each or those points. In order to obtain this information, many images must be captured with different focal distances. If a part of the image is determined to be in focus, then the range to that part of the image can be easily calculated. The focal length must, in effect be swept from too close to just right to too far. Range from focus method requires expensive hardware. It is slow because many different focus settings must be used and at each focus setting, a new image must be captured and analyzed. Furthermore only the range to features can be computed.

Time-Of-Flight 3D ranging methods based on concept of time of flight measure directly the range to a point on an object by measuring the time required for a light pulse to travel from a transmitter to the surface and back to a receiver or by the measurement of the relative phase of modulated received and transmitted signals. The "laser radar" approaches actually scan with a single spot, and effectively measure the range to each point in the image one point at a time. Scanning of the light beam is required in order to obtain a full frame of range image, and hence is limited in speed.

Active Triangulation

Range finding by triangulation is based on the fact that if a base line and the two angles of a triangle are known the lengths of the other sides may be determined. In the most straightforward form of active triangulation a beam of light is used to form a bright stripe on an object's surface and a camera displaced in a known distance(base line) from the light source views the scene. One angle of the triangle is defined by the angle to the base line of the beam of the light and the other angle is measured via the position of the light strip in the camera (CCD array or lateral effect photodiode).

Structured Illumination

In both the light stripe and the single dot approach, the projected feature must be scanned over the scene for an overall measurement to be made. The need for scanning may be removed and the efficiency of use of a 2D CCD camera may be increased significantly by the projection of a pattern of light such as an array of dots, stripes, or a grid simultaneously onto the scene. However the problem of ambiguity is aroused as to matching each of the stripes in the image with each projected strips. Furthermore, such method can not achieve single pixel resolution of range image because processing information from a group of pixels is required to determine the location of a structured light element (a dot or a stripe) in the image.

Active Triangulation Using Special CCD Camera

Assume that the plane of light scans rapidly across the scene so that the entire scene is scanned within one frame time. A special CCD camera is built so that the output values of camera pixels represent the angle at which the scanning line hit that pixel, instead of the amount of light which has hit the pixel. The geometry of the CCD array provides additional angle associated with the pixels so the range can be calculated based on these two angle and the length of the base line. The camera pixels are implemented using capacitors which store given charges before plane light scanning starts and gradually discharge when the scanning starts until the bright line image passes through the pixels. Arithmetic logic is then counts the remaining charges on the capacitors and provides angle information. This method is able to provide a high speed and single pixel resolution range image. However, it requires scanning plane of light.

Moiré Contouring

Moiré techniques use some form of structured light, typically a series of straight lines in a grating pattern, which is projected onto an object in the scene. This pattern on the object is then viewed from some other angle through a secondary grating, presenting a view of the first grating line which has been distorted by the contour of the part. The viewed image contains the moiré beat pattern. To determine the 3D contour of the object, the moiré techniques based on the phase shifting, fringe center mapping, and frequency shifting rely heavily on both extensive software analysis and rigorous hardware manipulation to produce different moiré patterns of the same object.

SUMMARY OF THE INVENTION

The target of the present invention is to provide an automatic high speed, low-cost, multi-mode three-dimensional(3D) surface profile measurement method. This method exploits at least one energy radiation source to illuminate the object in the scene and using at least one 2D image sensor array to obtain a full frame of image of the scene. The novel idea of our method is that the projected energy has a known spatially varying wavelength spectrum such that each point on the scene is illuminated by the projected radiation energy with a unique wavelength, and this unique wavelength is encoded with information of a unique projection ray of the radiation energy in 3D space. The pixels of the 2D image sensor used in this method are able to detect and to uniquely distinguish the wavelength of the radiation energy at the points of interest on the scene.

Each pixel of the 2D image sensor is also associated with a unique ray in 3D space through the focal point of the image sensor optical system so we know the angle between image sensor axis and the ray. The energy projection ray and the observation ray from the image sensor intercepts on the surface of the object in the scene. This gives us a typical triangulation problem which can be solved for the range value associated with each pixel. Since the pixel values of image obtained by the 2D image sensor contain the sufficient geometry information of the projection ray of the radiation energy, full frames of 3D range images can be obtained directly at the frame acquisition rate of the 2D image sensor array. By "full frame of 3D range image" we mean that the value of each pixel in the image will represent the distance from image sensor's focal point to the corresponding point in the scene. Our method eliminates the time consuming corresponding feature finding problem of normal binocular 3D imaging systems.

The color ranging method is able to capture full frame 3D range data at the frame rate of the camera. Therefore, it is suitable for high speed, real-time measurement automation. Since there are no mechanical moving parts in our color ranging method, the mechanical design can be very simple and reliable. All components in this system are available off-the-shelf which leads to low cost. With the active light source being turned on or off, the same color camera can provide normal intensity images as well as 3D range data. This multi-mode capability greatly simplifies the problems of multiple sensor integration and sensor data fusion. Depending on the applications, the scope of the color spectrum of the energy projector can be selected from UV, visible, or IR light region. The Color Ranging method is not based on a laser therefore there is no "eyes safe" problem. This is certainly a desirable feature enable this system to be used for other commercial applications, such as medical applications like the facial plastic reconstruction surgery evaluation.

DESCRIPTION OF THE PREFERRED EMBODIMENTS

The operation of the color ranging method is straightforward. The color spectrum of projected light on the scene has an one-to-one correspondence with the projection angle of the plane of light with that particular color spectrum. The color spectrum of each pixel on the image captured by the camera provides the necessary geometrical information, in addition to the coordinates of the pixel, to facilitate the triangulation of the 3D range calculation.

Figure 1:
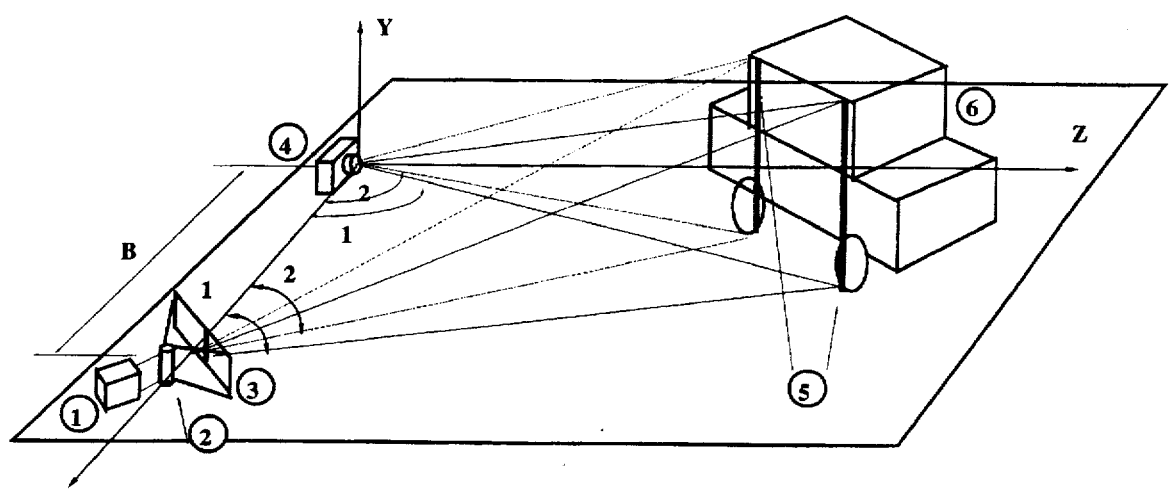
FIG. 1 shows one embodiment of the present invention of the color ranging method. The plane of light projector, marked ①, generates a sheet of white light which passes through a cylindrical lens, marked ②, to form a "fan beam" light source. This fan beam light passes through a linear variable wavelength filter(LVWF), marked ③, to illuminate the scene containing objects of interest, marked ⑥. The reflected light is detected by the color camera, marked ④. Label B represent the baseline length. The darker and lighter shadow sheets of lights, marked ⑤, depict two light stripes with different spectrums (wavelength).

One embodiment of the present invention of the color ranging method is shown in FIG. 1. The plane of light projector, marked ①, generates a sheet of white light which passes through a cylindrical lens, marked ②, to form a "fan beam" light source. This fan beam light passes through a linear variable wavelength filter(LVWF), marked ③, to illuminate the scene containing objects of interest. The reflected light is detected by the color camera, marked ④. The procedures of constructing such described optical system is easily understood by those skilled in optical system design. Notice that for the convenience of explanation of operation principle, a LVWF is used in FIG. 1. The color ranging principle is not at all restrained by or rely on the LVWF to produce energy radiation. In fact, any means that can provide registered relationship between spatial distribution of energy projection ray with the wavelength of the ray may be used in the color ranging system.

If a visible range LVWF is used, the color spectrum of pixels on the captured image is determined by the proportion of Red, Green and Blue components (RGB). The color spectrum of each pixel has an one-to-one correspondence with the projection angle of the plane of light due to the fixed geometry of the cylindrical lens and the LVWF, therefore the color spectrum provides the angle $\theta$. Together with the coordinates of each pixel on the camera image plane and the known baseline from camera to cylindrical lens, the color spectrum provides all necessary information to determine the 3D range (x,y,z) of any spot on the surface of objects seen by the camera.

The darker and lighter shadow sheets of lights shown in the FIG. 1 depict two light stripes with different spectrums (wavelength). They are generated by white light filtered through different portions of the linear variable wavelength filter. The difference between spectrums of projected light stripes can be sensed by the color camera and the projection angles of $\theta_1$ and $\theta_2$ can be found based on the filter characteristics and the detected spectrums of darker and lighter light strips. Therefore the range data for the surface area corresponding to the darker and lighter light strips can be easily computed.

The major components of our color ranging system are a white fan beam generator, a color camera, and a linear variable wavelength filter(LVWF). The white fan beam can be produced by using a plane of light generator and a cylindrical lens. The color camera is an off-the-shelf product.

Figure 2:
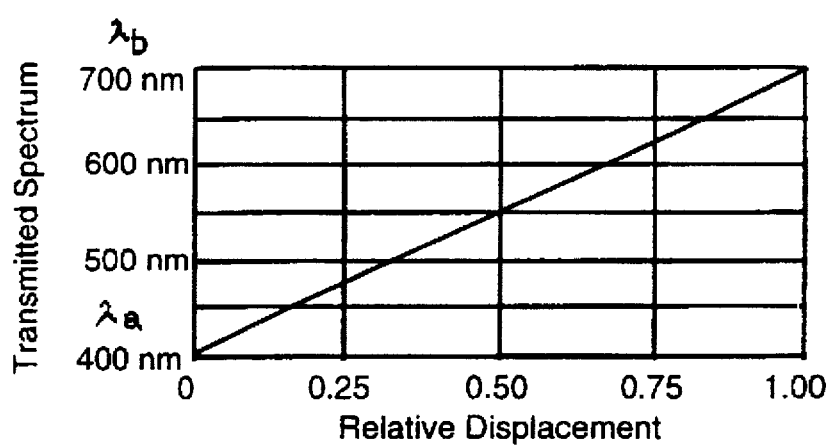
FIG. 2 plots measurement data provided by the manufacturer of LVWF showing its linearity.

The LVWF is a optical filter product commercially available. It is a rectangular optical glass plate coated with gradually varying wavelengths of colors. If the color spectrum of a LVWF is within visible light region, one edge of the filter rectangle corresponding to the lowest wavelength is the blue edge while the opposite edge is the red edge. The wavelength of the coated color layer is linearly proportional to the displacement of the position on the filter glass from the blue edge. This feature provides a simple and elegant way of generating structured light for an entire scene without using any moving parts. FIG. 2 plots measurement data provided by the manufacturer for its linearity. The color wavelength of the light λ passing through a particular position of the LVWF is a linear function of d, the displacement of that position from the blue edge of the filter glass:

$$\lambda(d) = \lambda_a + \frac{(\lambda_b - \lambda_a)}{L} d \quad (1)$$

where $\lambda_a$, $\lambda_b$ and L are filter parameters: $\lambda_a$ is the wavelength corresponding to the filter's "blue edge" (lowest wavelength color the filter can generate). $\lambda_b$ is the wavelength corresponding to the filter's "red edge" (highest wavelength color the filter can generate). L is the effective length of the filter. And d is the displacement from the blue edge.

The relative position of the LVWF is fixed with respect to the cylindrical lens so that the projected color through the LVWF corresponds to the angle θ between the light stripe projected through this line and the Projector-Camera base line b which is fixed. This fixed Color-angle θ relationship is the key idea for our Color Ranging system.

In addition to the LVWF for the visible light spectrum, other filters can also be used in the ranging system based on the color ranging method. These LVWF filters in the ranges of near infrared, mid-infrared, long infrared, and ultraviolet are also available commercially off-the-shelf.

The manufacturer of the LVWFs claims that the linearity is better than 1%. The absolute linearity is not important as long as the nonlinearity of the LVWF's distribution function does not affect the one-to-one relationship between wavelength and the displacement from the blue edge of the LVWF. Proper calibration procedures can be designed to record the actual distribution function in a look-up table.

A static calibration fixture can be designed with a known position and orientation with respect to the projector (cylindrical lens and LVWF) and camera. The fixture surface will cover the entire span of projected light and the reflectance function of the fixture is also known. By recording the light spectrum of reflected light from the fixture and the physical location of the spot, one can build a look-up table to store the true distribution function of a LVWF. The look-up table will be used to determine the projection angle θ.

Notice that other than the white fan beam light source shown in the FIG. 1, a point light source can also serve the purpose of providing illumination of the scene. The selection between them is matter of engineering judgment.

Figure 3:
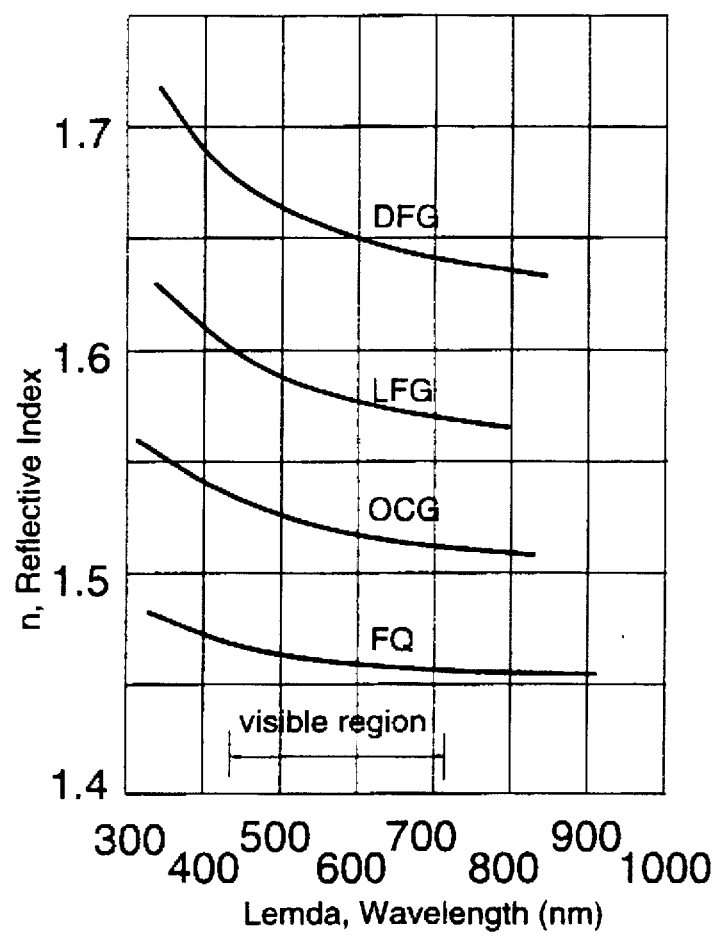
FIG. 3 shows the reflective index of three important types of glass and fused quartz varying with wavelength in the visible region.

Another embodiment of the color projection system used in the color ranging method is to utilize dispersion phenomena of a optical prism to produce a spatially variable wavelength illumination. The refraction of several types of optical glass varies with the wavelength of the incident radiation. FIG. 3 shows this variation in the visible region for three important types of glass and for fused quartz. When white light, which consists of light with all colors (wavelength), enters a substance, the variation of the reflective index with wavelength causes the various colors to be spatially separated or dispersed.

Figure 4:
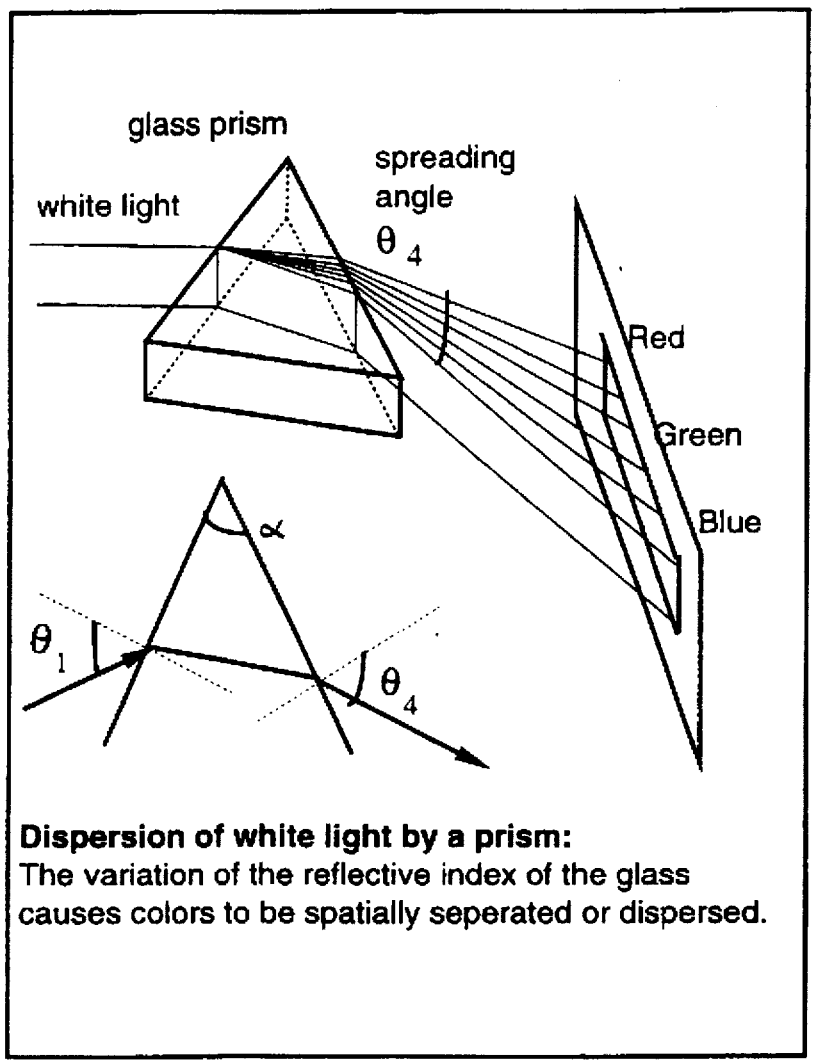
FIG. 4. illustrate a way to generate the spatially varying wavelength illumination using a prism. The white color is dispersed into a rainbow type of color spectrum.

A simple device that exhibits dispersion effectively is a triangular piece of glass or prism. When white light incident on a prism, the deviation angle is different for each color. The white color is then dispersed into a rainbow spectrum of colors, as illustrated in FIG. 4. Because n(red)<n(Blue) for the materials listed in FIG. 3, the red light is deviated less than blue light in passing through the prism.

The spreading angle Δθ4 of a spatially variable illuminating device based on a prism can be calculated and optimized in terms of its refractive angle α and incident angle θ1:

$$\sin\theta_4 = n \sin\left\{ \alpha - \sin\left(\frac{\sin\theta_1}{n}\right) \right\} \quad (2)$$

where n is the reflective index of prism material for a typical prism, the spreading angle Δθ4 can archive about 20 degree.

Figure 5:
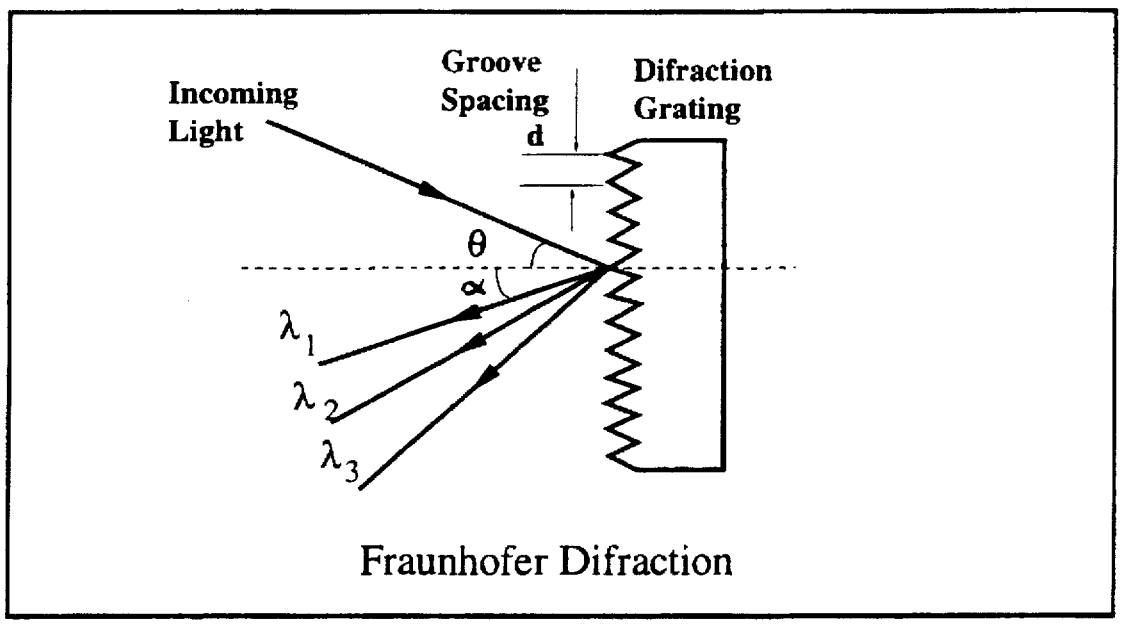
FIG. 5 shows a way to generate the spatially varying wavelength illumination using the diffraction gratings.

Still another embodiment of the color projection system used in the color ranging method is to utilize the diffraction gratings to produce a spatially variable wavelength illumination, as illustrated in FIG. 5. For a given incident light ray, the angle θ represents the angle between the axis normal to the grating surface and the ray direction. The light reflected (diffracted) by the grating surface is decomposed into many wavelength components. This diffraction is referred to as Fraunhofer diffraction and can be described by:

$$\sin(\alpha) - \sin(\theta) = \frac{m\lambda}{d} \quad (3)$$

where α is the angle between the reflected light and the axis normal to the grating surface, m is an integer representing the order number, λ is the wavelength, and d is the spacing between two adjacent stripes of the grating. We observe that the angle α is dependent on wavelength λ. For a given incident angle θ, ruling (grooving) spacing d and a particular order m, the angular dispersion effect can be obtained as:

$$\frac{d\alpha}{d\lambda} = \frac{m}{\cos(\alpha)d} \quad (4)$$

Figure 6:
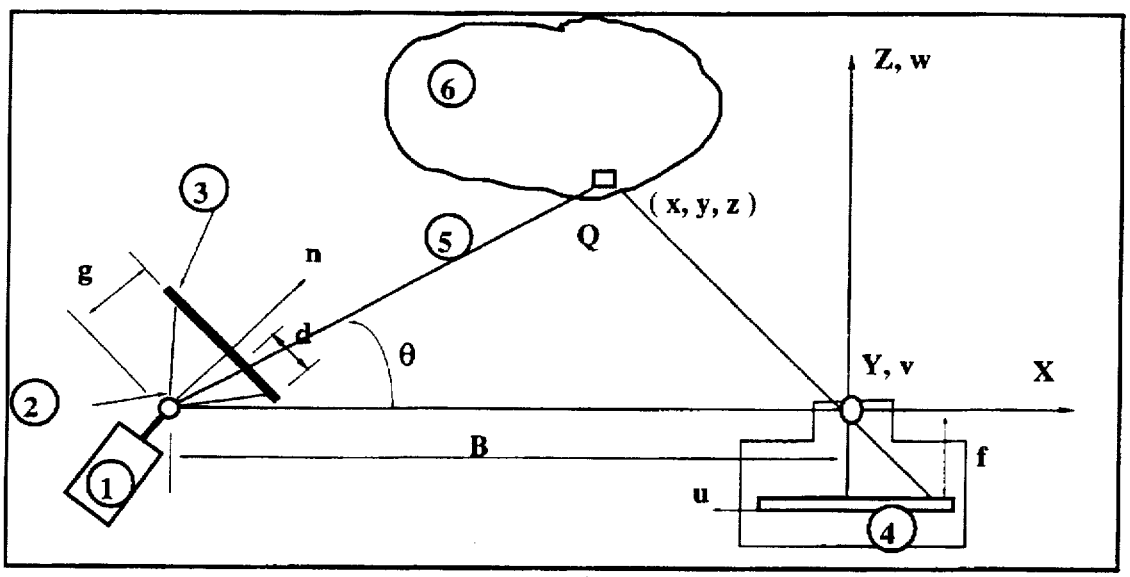
FIG. 6 is used to illustrate the 3D range value calculation procedure for the color ranging method.

The 3D range value calculation algorithms for the present invention of the color ranging system are straightforward and well understood by those skilled in machine vision areas. A typical steps to determine any spot Q on the surface of an object in the scene can be summarized as follows, as shown in FIG. 6:

(1) Find the projection angle θ corresponding to spot Q using the color spectrum data captured by the camera. The geometry and parameter definitions of the color ranging system are shown in FIG. 3. The cylindrical lens and camera lens form a baseline of the system. The fixed angle between the LVWF surface and the base line is represented by β. The distance between LVWF and the center of the cylindrical lens is g. The Red-Green-Blue ingredients of the pixel color of the image captured by the camera determines the wavelength λ, corresponding to any spot on the scene. Given λ corresponding to spot Q on the object surface, the displacement d(λ) can be found as:

$$d(\lambda) = \frac{\lambda - \lambda_a}{\lambda_b - \lambda_a} L \quad (5)$$

Then the angle q can be calculated by:

$$\theta = \beta - \tan^{-1}\frac{L/2 - d}{g} \quad (6)$$

(2) Based on triangulation principle, the 3D coordinates of the points on the object surface can be calculated as:

$$x = \frac{b}{f\,ctg\,\theta - u} \cdot u \quad (7)$$

$$y = \frac{b}{f\,ctg\,\theta - u} \cdot v$$

$$z = \frac{b}{f\,ctg\,\theta - u} \cdot f$$

We now discuss the relationship between projected color light and reflected light spectrum from the surface of an object seen by the image sensor. Suppose that the reflection characteristics of a spot on the object surface is described by a reflectance function $H(\lambda)$, where $\lambda$ is the frequency of reflected light spectrum. The spectrum of the projected light illuminating the spot can be expressed as $X(\lambda)$. Then the reflected light's spectrum can be obtained by the convolution of projected light $X(\lambda)$ with the reflectance function $H(\lambda)$ and sensor sensitivity function $R(\lambda)$.

Therefore the following relationship holds in the frequency domain:

$$Y(\lambda) = R(\lambda) * H(\lambda) * X(\lambda) \quad (8)$$

Figure 7:
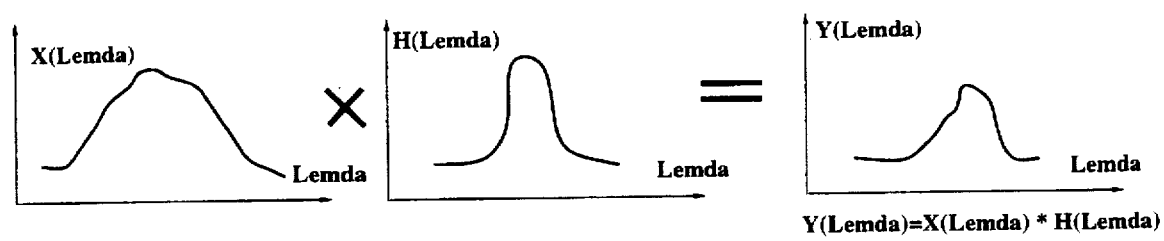
FIG. 7 shows the detected color spectrum of image sensor $Y(\lambda)$ as the convolution of the projected light $X(\lambda)$ with the reflectance function $H(\lambda)$ and sensor sensitivity function $R(\lambda)$.

The idea is illustrated by FIG. 7.

In the present invention of the color ranging system, the projected light spectrum $X(\lambda)$ instead of the light spectrum detected by camera $Y(f)$ is the main concerned, since the former provides the critical information of angle $\theta$ for triangulation. If the surface color of the object of interest is white, i.e. the reflectance function is uniform within the visible light region, then the reflected light spectrum observed by the camera is exactly the same as the projected light spectrum.

$$Y(\lambda) = X(\lambda), \text{ when } H(\lambda) = 1. \quad (9)$$

Figure 8:
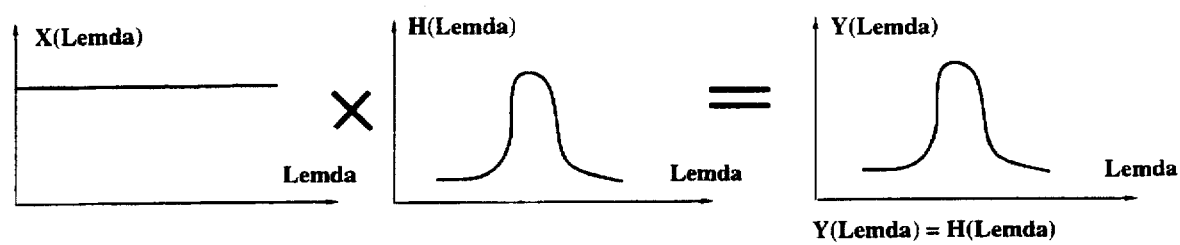
FIG. 8 shows a way to obtain the spectrum reflectance function of the object using the picture taken under the white light illumination.

However, in general, the surface color of the objects of interest are not pure white. Equation (8) indicates that in this case in order to find $X(\lambda)$ from $Y(\lambda)$, information about $H(\lambda)$ has to be known. One practical way to obtain $H(\lambda)$ experimentally is to project white light first on to the scene. Under the white light illumination, the color spectrum detected by the camera is exactly the reflectance function of the object. See FIG. 8. $H(\lambda)$ can be easily determined by illuminating the scene with white light and capturing the resulting image.

After obtaining $H(\lambda)$ the light filtered through the LVWF is projected on the same scene. The detected light spectrum $Y(\lambda)$ is then used together with $H(\lambda)$ to obtain $X(\lambda)$ using a deconvolution technique:

$$X(\lambda) = Y(\lambda)/H(\lambda) \quad (10)$$

The only condition to ensure the applicability of this technique is that the reflectance function should not be absolute zero within the projected light spectrum. In practical situations, this condition would almost always be met.

Figure 9:
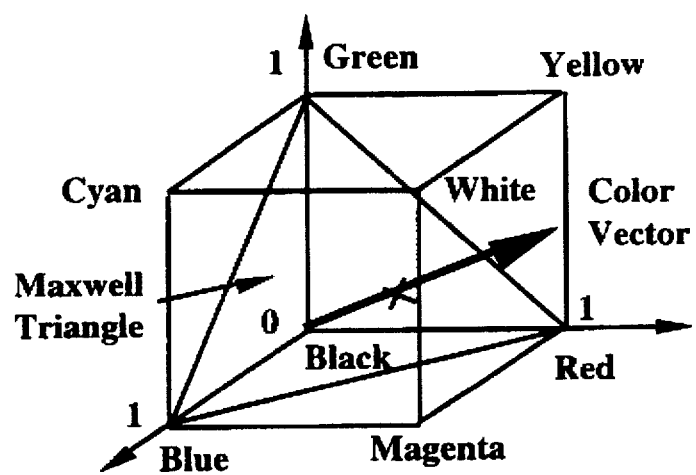
FIG. 9 shows a color detecting scheme using typical red, green, and blue primaries (RGB) as three mutual orthogonal axes. Any spectral light with single wavelength is located at one point on the Maxwell triangle.
Figure 10:
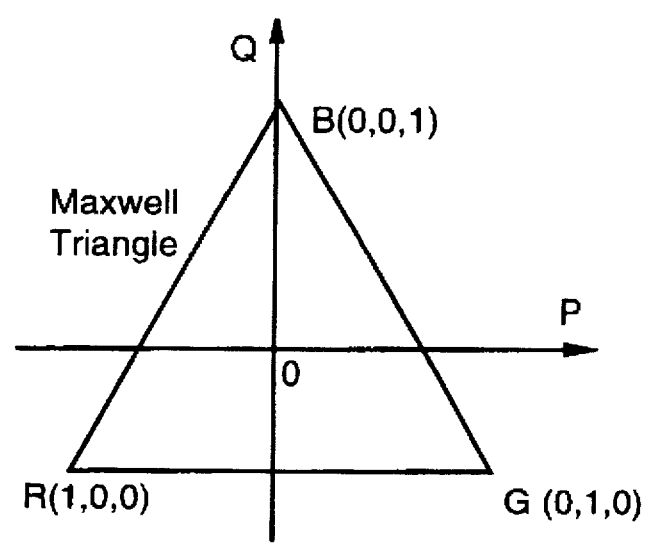
FIG. 10 shows a way to convert the color representation using three components (RGB) to a color representation using two components (PQ) to discount out the effect of intensity.

We now discuss the color detecting scheme of image sensor. We use visible light as example. However the same scheme can be used for other range of electromagnetic energy radiation. A particular color detected by a color camera may be described as a vector in the "color space" whose coordinates are three primary colors. Using typical red, green, and blue primaries (RGB) as three mutual orthogonal axes, a color space is formed as shown in FIG. 9. It is the orientation of the vectors, rather than the length of the vectors, that specify the color. In the FIG. 9, the Maxwell triangle was drawn between three primaries. There is a one-to-one correspondence between the intersection point of a color vector, which can be compute from a normalized output signal of a color RGB camera, and a detected color. We can further convert the detected color into a PQ representation in a 2D space. Establish a P-Q coordinate system on the Maxwell triangle. One kind of transform from the RGB coordinates to the PQ coordinates is defined as follows:

$$\begin{bmatrix} p \\ q \end{bmatrix} = \begin{bmatrix} -\frac{1}{\sqrt{2}} & \frac{1}{\sqrt{2}} & 0 \\ -\frac{1}{\sqrt{6}} & -\frac{1}{\sqrt{6}} & \frac{2}{\sqrt{6}} \end{bmatrix} \begin{bmatrix} r \\ g \\ b \end{bmatrix}$$

where $$\begin{bmatrix} r \\ g \\ b \end{bmatrix} = \frac{1}{\sqrt{R^2 + G^2 + B^2}} \begin{bmatrix} R \\ G \\ B \end{bmatrix}$$

and R, G, and B are the measured color components of Red, Green, and Blue.

We see no theoretical limitations on the range accuracy that can be achieved by the color 3D ranging system. The actual accuracy of a specific system will depend on the implementation. The principle factors are the quality of the color camera components available and the resolution of the image frame grabber used. If the camera optical system has no distortion on the color spectrum and if the color image frame grabber has an infinite resolution, then the system should be able to obtain the projected light spectrum on the surface of object on the scene accurately. The equations (1) to (7) can be used to calculate (x, y, z) accurately.

The most popular low cost frame grabbers have 8 bit resolution for each color component of Red, Green, and Blue (RGB). Totally, they are able to distinguish $2^{24}$ color combinations. However, the color spectrum depends on the proportion of RGB ingredients rather the absolute values of each component, therefore the number of discrete color spectrum lines that can be identified by such system should be smaller than $2^{24}$.

The spatial resolution of our color ranging system is limited only by the spatial resolution of the camera optical sensing element. The resolution of color spectrum of the light projected through the LVWF is infinite due to the continuity nature of wavelength varying of the LVWF fabrication.

A number of camera manufacturers are recently able to provide a color camera for our color ranging system with 1024 by 1024 and/or 2048 by 2048 pixel resolution. This level of spatial resolution is comparable with many practical applications, such as initial inspection of a tire tread. In cases where a higher spatial resolution is needed, we can zoom-in the camera into a smaller viewing area for detailed inspections.

To further enhance the spatial resolution of our color ranging system, subpixel algorithms can be adopted to achieve subpixel accuracy.

In many practical applications, ambient light illuminates the objects on the scene. Ambient light will distort the color spectrum of projected light. If no compensation measure is employed the color ranging system will suffer from loss of range accuracy.

Ambient light distortion can be easily compensated. First turn off the projector light and capture and store a frame of the image under ambient light. This stored image can be used to subtracted from the image captured later. The difference image would then be used to generate the range map.

The color ranging system described here has multiple mode sensing capability which greatly facilitates the sensor data fusion. The light projector of the color ranging system can be controlled, on or off, by computer controlled means. When the light projector is on, the camera captures a color image by which 3D range data can be obtained for the object on the scene. When the light projector is off, camera will capture normal light intensity image data for the same scene. The color ranging system provides a multiple sensing mode application using a single camera.

Range data and intensity data, both acquired by the same camera, provide complementary information. Range data provides important clues on the geometry of an observed scene. However, it does not provide any information about physical properties of the scene such as color or intensity. On the other hand, it is extremely difficult to extract geometrical information from intensity image data. Therefore, both types of data can be analyzed together synergetically. In our color ranging system, there is no correspondence problem between range data and normal intensity image data since they are captured using exactly the same camera in the same place. This feature simplifies multiple sensor fusion over conventional techniques such as stereo vision, where the correspondence between range data and the corresponding point in the intensity image is difficult to determine, and in some cases is impossible to determine.

The invention claimed is:

1. An apparatus for determining projection angles of light rays based on values of the wavelength of the projected individual light ray, comprising (a) a light projection means for generating a bundle of light rays with spatially varying wavelengths to illuminate surface of objects in the scene such that light rays projected from different projection angles ($\theta$) have different spectral wavelengths ($\lambda$), and (b) a sensor means for detecting the wavelengths ($\lambda$) of light rays reflected from objects' surface that is illuminated by said light projection means, and (c) a calibration means for relating the wavelengths ($\lambda$) detected by said sensor to the light ray projection angles ($\theta$), whereby projection angles ($\theta$) of light rays can be determined based on the wavelengths ($\lambda$) of the light rays detected by the sensor.

2. An apparatus as recited in claim 1, wherein the structured illumination is generated by using a light source and a variable wavelength filter for producing simultaneously a bundle of light rays spreading more than one dimensions and with spatially varying wavelengths.

3. An apparatus as recited in claim 1, wherein the structured illumination is generated by using a light source and a prism for producing simultaneously a bundle of light rays spreading more than one dimensions and with spatially varying wavelengths.

4. An apparatus as recited in claim 1, wherein the structured illumination is generated by using a light source and a diffraction grating for producing simultaneously a bundle of light rays spreading more than one dimensions and with spatially varying wavelengths.

5. An apparatus for determining 3D coordinates of surface points of objects in the scene, comprising (a) a light projection means for generating a bundle of light rays with spatially varying wavelengths to illuminate surface of objects in the scene such that light rays projected from different projection angles ($\theta$) have different spectral wavelengths ($\lambda$), and (b) a sensor array means for detecting the wavelengths ($\lambda$) of light rays reflected from objects' surface that is illuminated by said light projection means, and for determining the viewing angle ($\alpha$) of the surface point corresponding to each pixel of the image sensor array based on image sensor's geometric and optical parameters, and (c) a calibration means for relating the wavelengths ($\lambda$) detected by each pixel of said sensor array to light ray projection angles ($\theta$) for surface points viewed by all pixels of the sensor means, and (d) an data extraction means for computing distances in the 3D space between the focal point of the image sensor array and surface points in the scene (and therefore determining 3D coordinates of surface points of objects in the scene), based on (i) values of light projection angles ($\theta$) determined by said sensor array and said calibration means, (ii) viewing angles ($\alpha$) of pixels in said sensor array determined by its geometric and optical parameters, and (iii) distance between said image sensor and said light projector in the 3D space.

whereby full frames of 3D images, in which each pixel value represents a 3D distance between the focal point of the image sensor array and a surface point in the scene corresponding to the pixel, can be obtained at sensor array's frame rate.

6. An apparatus as recited in claim 5, wherein the structured illumination is generated by using a light source and a variable wavelength filter for producing simultaneously a bundle of light rays spreading more than one dimensions and with spatially varying wavelengths.

7. An apparatus as recited in claim 5, wherein the structured illumination is generated by using a light source and a prism for producing simultaneously a bundle of light rays spreading more than one dimensions and with spatially varying wavelengths.

8. An apparatus as recited in claim 5, wherein the structured illumination is generated by using a light source and a diffraction grating for producing simultaneously a bundle of light rays spreading more than one dimensions and with spatially varying wavelengths.

* * * * *